United States Patent
Baker

(10) Patent No.: US 6,937,711 B2
(45) Date of Patent: Aug. 30, 2005

(54) SYSTEM AND METHOD FOR ISSUING CUSTOMER CREDITS FOR INFORMATION ASSISTANCE SERVICES

(75) Inventor: Nathan Bryant Baker, Tigard, OR (US)

(73) Assignee: Metro One Telecommunications, Inc., Beaverton, OR (US)

(*) Notice: Subject to any disclaimer, the term of this patent is extended or adjusted under 35 U.S.C. 154(b) by 366 days.

(21) Appl. No.: 10/160,415

(22) Filed: May 31, 2002

(65) Prior Publication Data

US 2003/0223559 A1 Dec. 4, 2003

(51) Int. Cl.[7] ............................................. H04M 15/00
(52) U.S. Cl. ............................ 379/114.12; 379/114.01
(58) Field of Search ............................. 379/111, 114.01, 379/114.05, 114.12, 114.23, 114.28, 121.02, 127.01

(56) References Cited

U.S. PATENT DOCUMENTS

| | | | | |
|---|---|---|---|---|
| 5,222,120 A | * | 6/1993 | McLeod et al. | 379/88.24 |
| 5,797,092 A | * | 8/1998 | Cox et al. | 455/404.1 |
| 5,857,015 A | * | 1/1999 | Salmanian | 379/127.02 |
| 6,539,080 B1 | * | 3/2003 | Bruce et al. | 379/88.17 |

* cited by examiner

Primary Examiner—Curtis Kuntz
Assistant Examiner—Barry Taylor
(74) Attorney, Agent, or Firm—Kaye Scholer LLP

(57) ABSTRACT

In a system for providing customers with information assistance services, records are generated to register service events. In prior art, all of the records are transmitted to a billing platform for billing customers for the services. When a customer requests credit for an unsatisfactory service, the credit issuance is traditionally handled at the billing platform. However, in accordance with the invention, the credit issuance is handled by first identifying, from the records, those records of service events for which the credit is requested. All of the records, except the identified records, are then transmitted to the billing platform for completion of the billing process, thereby effecting the credit issuance.

39 Claims, 4 Drawing Sheets

200

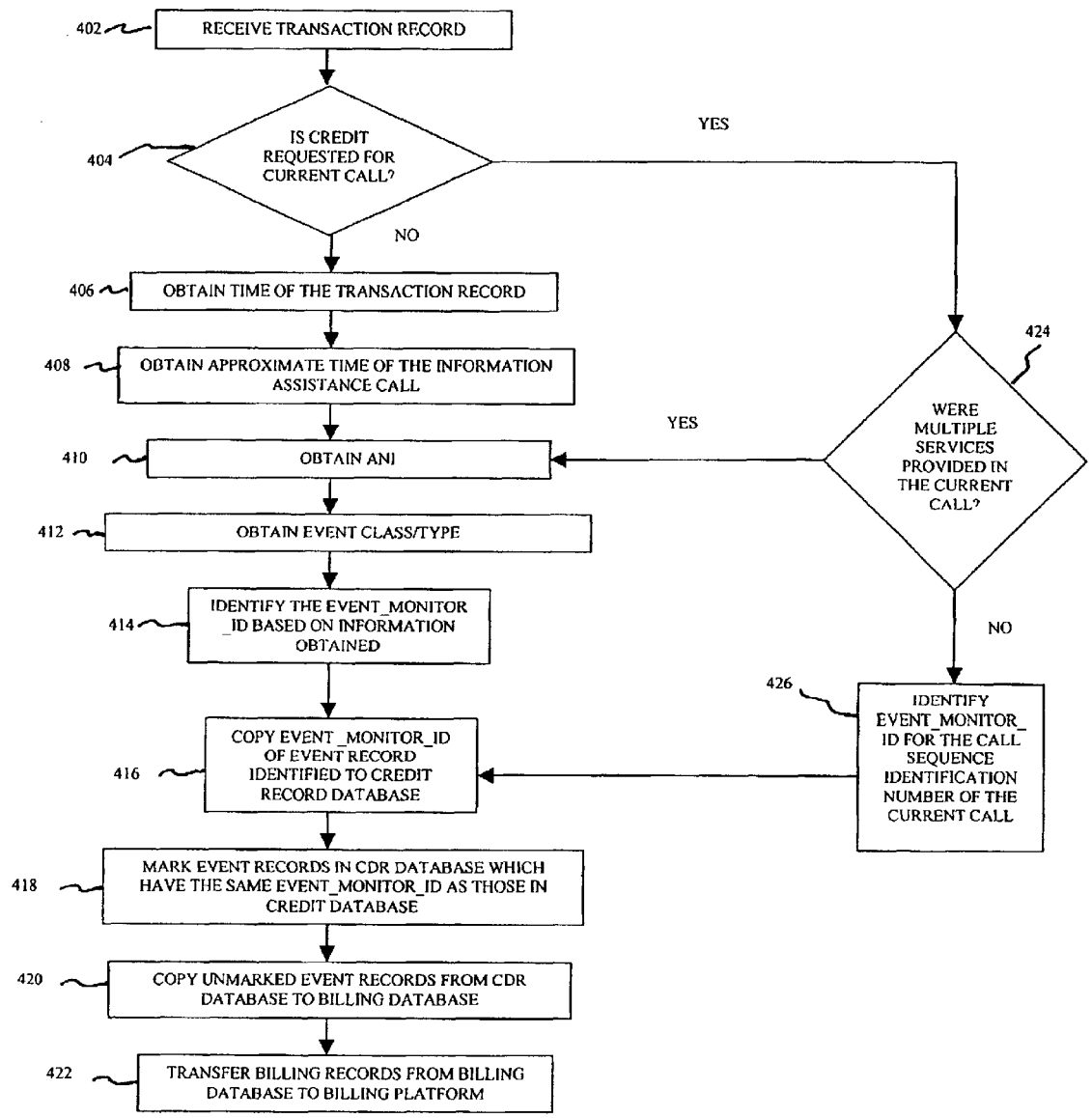

SYSTEM AND METHOD FOR ISSUING CUSTOMER CREDITS FOR INFORMATION ASSISTANCE SERVICES

FIELD OF THE INVENTION

The invention relates to a communications system and method, and, more particularly, to a communications system and method for issuing credits to a customer pertaining to requested services in an information assistance call.

BACKGROUND OF THE INVENTION

It is a common experience to use, e.g., a wireless or wireline telephone, to call a telephone operator for information assistance. In a typical information assistance call, a caller, i.e., customer, identifies to the operator the name and address, or sometimes city or area code, of a party whose telephone number is desired. In response, the operator locates the desired destination number using, e.g., a computer database. The destination number may be provided to the customer by a computerized voice server, and the customer is afforded the option to be connected to the destination number without the need to first terminate the information assistance call.

Even though a customer subscribes to a telephone service provided by a particular carrier, e.g., AT&T Wireless Services Inc., or branding partner, e.g., Virgin, the information assistance service accessed through the telephone service may be contracted by the carrier, and may be operated by an independent contractor. Thus, carriers may contract with different information assistance providers to provide information assistance services for them. When a subscriber to the carrier makes an information assistance call by dialing such typical access digits as "411," "*555," "555-1212," "00," "1-800-555-1212," etc., because of the contractual relationship, the carrier routes such an information assistance call to its contracted information assistance service provider to handle the information request.

Enhanced information assistance services may also be provided to a customer, via contract with a carrier, during or after connection to a destination number in an information assistance call. For example, upon request, an operator may also search certain databases to obtain for the customer information concerning restaurants, movie listings, directions to given places, etc. These databases may provide such information as the titles of the movies being played, the names of the theaters playing a given movie, and the telephone number of a given theater, etc. Another example of an enhanced service is the STARBACK® service, disclosed in U.S. Pat. No. 5,797,092 ("the '092 patent"), whereby a caller after being connected to a desired party can be reconnected to an operator by pressing a "*" key, or otherwise issuing a command, e.g., saying "operator."

A customer may request a credit for unsatisfactory services in an information assistance call, conveniently termed a "bad call" here. Such a credit request conventionally requires that a credit transaction be processed downstream in a billing platform. This downstream bill processing is typically conducted by a third party, but may be conducted by the information service provider. This downstream processing of customer credits for bad calls generates considerable expense for the entity which bills the calls, which may or may not be the information service provider.

Typically, an operator takes down certain call information concerning the call for which credit is requested and transmits that information, as a hardcopy document, to the billing platform vendor. Alternatively, the operator may input the credit request call information into a computer, which then creates a credit request file that is transmitted to the billing platform. Thus, conventionally, an event record for the call to be credited is transmitted to the billing platform, along with the hardcopy credit request document or the credit request file, as the case may be.

During bill processing in the billing platform, a search may be conducted in the billing platform, either manually or as part of a computer routine, to identify and pull the billing record corresponding to the credit request. Once the record is identified, a credit transaction is performed so that the credit and the call charge appear on the same invoice. Thus, downstream processing of credit requests results in not only the bad call being processed, but also the subsequent credit.

All records entering bill processing downstream from call processing, i.e., entering the billing platform, generate an expense. This expense is increased when a credit transaction must also be processed because it increases not only the number of records to be processed in the billing platform, but also requires special handling for the creation of the credit transaction.

Credit requests further increase bill processing expenses because often these requests are made via calls to a customer service center. Customers typically call the information service provider's customer service center toll-free number, which results in the information service provider incurring expensive 1-800 line charges. In addition, calling an information assistance provider's customer service call center also results in the information service provider incurring additional expenses associated with taking up the customer service operator's time.

The conventional process for providing customers with credit can also result in excess credit being given. For example, credit may be given for an entire call, even though credit for only a portion of the call is due. In addition, downstream credit processing may also result in credits being given for calls that were not bad calls because of errors inherent in issuing credit manually.

What is desired, therefore, is a system and method for cost-effectively issuing customers credit for a bad call (which is understood to include a portion of a call). What is further desired is a system and method for ensuring that credit is issued for only the portion of a call in which wrong or no service was provided. What is still further desired is a system and method for more accurately identifying the call or portion of the call which is to be credited.

SUMMARY OF THE INVENTION

Accordingly, an object of the invention is to provide a system and method for issuing customer credits for bad calls, relating to information assistance services, upstream from a billing platform where final bill processing is conducted. Another object of the invention is to provide a system and method for issuing customers credit for a portion of a call where information assistance services were requested, which resulted in no service, or wrong service. A further object of the invention is to provide a system and method for more accurately identifying an information assistance call or portion of the call which is to be credited.

These and other objects, features and advantages of the invention are achieved by a method for issuing customer credits for services requested in information assistance calls, which collects records indicative of the services for billing customers. Upon receiving a request for credit, a determination is made concerning whether the request is received before a termination of the call. Data is obtained concerning at least an identifier identifying the call when it is determined that the request is received before a termination of the call. At least one record is identified from the collected records which concerns the service and contains the identifier. The method causes the services in the collected records, except the services which concern the service for which credit is requested, to be billed. These and other objects, features and advantages of the invention will become apparent from the following detailed description taken in conjunction with the accompanying drawings showing an illustrative embodiment of the invention.

BRIEF DESCRIPTION OF THE DRAWING

FIG. 4 is a flow chart depicting a credit processing routine run in the communications system of FIG. 1.

DETAILED DESCRIPTION

Figure 1:
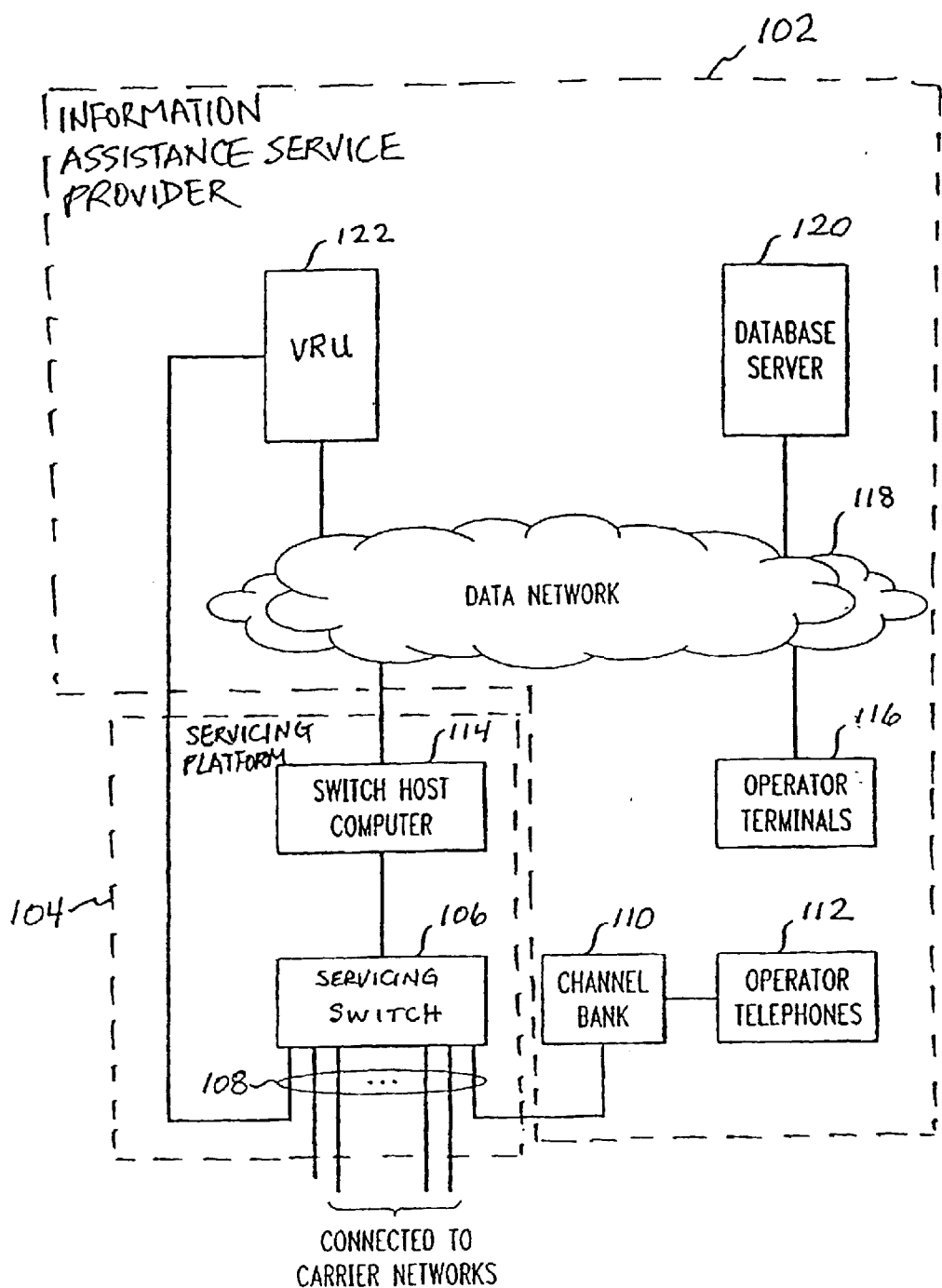
FIG. 1 illustrates a communications system for providing information assistance services and issuing customer credits in accordance with the invention.

FIG. 1 illustrates information assistance system 100 embodying the principles of the invention, which includes an information service provider 102 and a servicing platform 104. Information assistance system 100 provides information assistance services and issues credits to customers for unsatisfactory services in accordance with the invention. It is understood that a customer may request information from information assistance system 100 via the customer's telephone (wireless or wireline), computer, personal data assistant (PDA), a personal information manager (PIM) or other telecommunications device (Blackberry, beeper or other device).

Customers of a particular telephone carrier or company may dial, speak or otherwise communicate the access digits, access codes or retail numbers, or input an address or a URL established for information assistance by that carrier to access information assistance service provider 102. For example, the predetermined access digits may be "411," "*555," "555-1212," "1-800-555-1212," "00," or other designated access numbers. Upon receiving such access digits from a customer's communications device, the participating telephone carrier's switching system, routes the call to information assistance system 100 (via a T1 link, as discussed below), where it appears as an incoming call.

As shown in FIG. 1, servicing platform 104 includes a servicing switch 106 having one or more external T1 communications connections or links 108, and a host computer 114. Switch 106 is connected via T1 links 108 to one or more carrier networks (not shown in FIG. 1). Accordingly, system 100 receives through switch 106 an incoming information assistance call from a carrier network via a T1 link 108. It is understood that T1 links 108 may be voice, data or video connections through which incoming and outgoing voice, data, and/or video communications can be made. It is also understood that outgoing communications may be placed over the same or different carrier networks than the carrier network on which the incoming communication was received.

Switch 106 is a conventional switch. In this illustrative embodiment, switch 106 supports digital T1 connectivity. Switch 106 includes digital signal processing circuitry (DSPs). Thus, switch 106 can be programmed and reprogrammed to function as, among other things, call progress analyzers (CPAs), call progress generators (CPGs), multi-frequency (MF) tone generators/detectors, dual-tone multi-frequency (DTMF) generators/detectors, and/or conferencing units, depending upon the demand placed on system 100 and switch 106 for each corresponding function. It is understood that switch 106 may be, but is not required to be, a private branch exchange (PBX) switch.

Switch 106 receives from carrier network switch (not shown in FIG. 1) call setup signals containing data concerning the call, such as an automatic number identification (ANI), i.e., the originating telephone number, a dialed number identification string (DNIS) for identifying the dialed telephone number, the area of the call's originating site, and/or a customer identification number assigned by the carrier. The received set-up signals, are monitored and processed by host computer 114, such as in the issuance of customer credits. Thus, upon receiving set-up signals, switch 106 generates an event record, such as that of FIG. 2, recording the receipt of the call which includes at least the ANI, as the subscriber identification number, such as SUBSCRIBER_MDN 207 of FIG. 2, and may also include some or all of the remaining call setup information. Also upon receiving the call in the switch 106, host computer 114 assigns a call sequence number, such as CDR_CALL_SEQ_NMBR 213 of FIG. 2, which uniquely identifies the call within the information assistance system 100.

Switch 106 is also connected via a T1 link 108 to channel bank 110 for coupling to operator telephones 112 manned by operators. Each operator is equipped with a terminal 116 that includes a monitor, mouse and keyboard with associated dialing pad. The operator terminals 116 are coupled over data network 118 to one or more database servers 120 (only one is shown in FIG. 1), which allow an operator to access data in database server 120 using operator terminals 116. Database server 120 contains, among other information, public and private information, such as information available over a local area network (LAN), a wide area network (WAN), the Internet, and private user profile information available from any source. Database server 120 enables the operator to provide information assistance including searching for a customer's desired party and determining the appropriate destination telephone number, or searching by type of goods/services and/or geographic region, thereby providing a caller with information on restaurants, movie listings, directions to various places, or virtually any other information available over data network 118.

Data network 118 further connects to voice response unit (VRU) 122, and host computer 114, which may be, but is not required to be, a private branch exchange (PBX) host computer. Data network 118 includes, but is not limited to, a LAN. The LAN may connect to other similar remote LANs to form a wide area network (WAN). LANs may be connected to one another and/or to the Internet via routers and/or other conventional means. Thus, as discussed briefly above, data network 118 enables information assistance system 100 to provide public directory information, private directory, LAN or WAN information, user profile information, and/or other information available over the Internet to a customer.

The operation of switch 106 is governed by computer-readable instructions stored and executed on switch host computer 114. Host computer 114 acts as a slave processor, via data network 118, for voice response unit (VRU) 122. VRU 122 is connected to switch 106 via a T1 line. Each VRU 122, when more than one is employed in information assistance system 100, connects to switch 106 via a separate T1 link. VRU 122 is employed to play the constantly repeated parts of an operator's speech, namely, the various greetings and signoffs (or closings), and the caller's desired telephone number where requested. At appropriate stages in a call's progression, host computer 114 initiates a voice path connection between VRU 122 and switch 106, such that the customer or the customer and the operator are able to hear whatever pre-recorded speech is played on that connection by VRU 122. Computer 114 then instructs VRU 122, via data network 118, what type of message to play, and passes data parameters that enable VRU 122 to locate the message appropriate to the call state. VRU 122 may also contain a voice recognition system for receiving verbal input from a party connected to the VRU 122.

Automatic call distribution (ACD) logic, which may reside in host computer 114 or elsewhere in system 100, is used to queue (if necessary) and distribute calls to operator telephones 112 in the order in which they are received, and such that the call traffic is distributed evenly among the operator telephones 112. In other embodiments, other distribution logic schemes may be utilized, such as skills-based routing or a priority scheme for preferred callers.

During an information assistance call, multiple events may occur which include, e.g., a destination number connection event, restaurant search event, movie inquiry event, directions inquiry event, etc. In this illustrative embodiment, a record is created to account for each event ("event record"). For example, when a customer calls for information assistance, and an operator is unavailable, the call is placed in a queue by platform 104. At the same time, host computer 114 generates a first event record concerning the queuing event. When the call is ultimately connected to the operator, i.e., operator telephone 112, by platform 104, host computer 114 then generates a second event record concerning the operator connection event. If the customer asks the operator to search for a movie theater playing a given movie in a particular area, the operator utilizes database server 120 to locate one such theater. Database server 120 then generates a third event record concerning the movie search event, and a fourth event record concerning the search results including information about the located theater. Further, if the customer asks to be connected to the destination number of the located theater, the operator initiates a call to the destination number through database server 120, which then generates a fifth event record concerning the call initiation. Accordingly, switch 106 connects the current information assistance call to the destination number, via a T1 link and over a carrier network's switch (terminating switch), and host computer 114 generates a sixth event record concerning the connection. If the connection results in ringing with no answer, VRU 122 presents to the customer menu options for selection, and VRU 122 generates a seventh event record concerning the menu presentation. If for any reason the customer utilizes a STARBACK® service to be reconnected to an operator, host computer 114 generates an eighth event record concerning the STARBACK® event. As one can appreciate, as the information assistance call goes on, more and more events may occur and thus, more and more event records are generated during the call.

Figure 2:
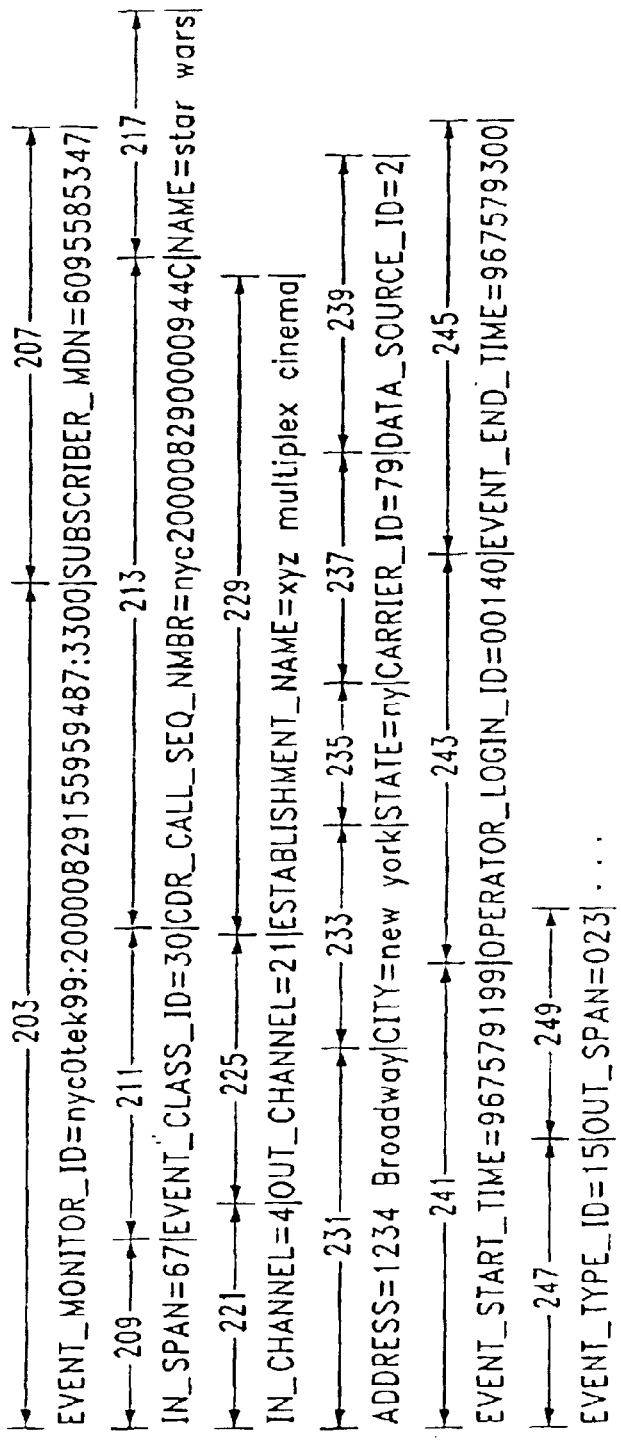
FIG. 2 illustrates an event record for an event in an information assistance call.

FIG. 2 illustrates one such event record 200, which is generated by database server 120, as a result of conducting a movie search during an information assistance call. As shown in FIG. 2, event record 200 includes multiple fields describing a search result event. Specifically, EVENT_MONITOR_ID field 203 contains a sequence of alphanumeric characters uniquely identifying event record 200. SUBSCRIBER_MDN field 207 identifies the telephone number of the customer who made the information assistance call, i.e., the automatic number identification (ANI). IN_SPAN field 209 identifies the T1 span transporting the incoming communication of the information assistance call. In this illustrative embodiment, each event is identified by an event type within an event class. EVENT_CLASS_ID field 211 specifies one of the event classes to which the instant event belongs. For example, the value "30" in field 211 in this instance, corresponds to a SEARCHES class. Other values for field 211 may correspond, e.g., to CALL PROCESSING, VALUE ADDED SERVICE and LOCAL SERVICES classes. EVENT_TYPE_ID field 247 specifies one of the event types within the class identified by the value in field 211. For example, the value "15" in field 247 in this instance, corresponds to a movie search result event within the SEARCHES class. Similarly, other values for field 247 correspond to different types of events in an identified class.

CDR_CALL_SEQ NMBR field 213 contains a sequence number identifying the information assistance call in question. It should be pointed out that event records concerning different events occurring in the same call share the same value in field 213. To that end, when the information assistance call is initially received by platform 104, host computer 114 assigns a sequence number identifying the call. Host computer 114 then transmits the sequence number to switch 106, operator terminal 116, voice response unit 122, database server 120, and any other components on data network 118 for them to incorporate the sequence numbers in any event record generated thereby for the call. Thus, the event records relating to a single call, determined by, e.g., CDR_CALL_SEQ_NMBR field 213, can be correlated after they are generated to provide a complete activity log for the call/session. These event records can be incorporated in one or more databases in memories of servers or computers connected to data network 118, such as will be described below, for further processing and analysis relating to billing and the issuance of customer credits in accordance with the invention, or any other desired analysis or processing.

Name field 217 in this instance contains a particular movie title, e.g., STAR WARS, for which the movie search was conducted. IN_CHANNEL field 221 identifies the channel (within the T1 span identified by field 209 previously described) which the incoming communication of the information assistance call traverses. OUT_CHANNEL field 225 identifies the channel (within the T1 span identified by field 249 described below) which the outgoing communication of the information assistance call traverses. ESTABLISHMENT_NAME field 229 contains the name of the movie theater, e.g., XYZ Multiplex Cinema, resulting from the movie search. ADDRESS field 231 contains the address of the movie theater. CITY field 233 contains the name of the city, e.g., New York, which the movie theater is in. STATE field 235 contains the name of the state which the movie theater is in. CARRIER_ID field 237 identifies the carrier used to connect the call. For example, the value "79" in field 237 identifies AT&T Corp. as the carrier in this instance. DATA_SOURCE_ID field 239 identifies the client which generates record 200. EVENT_START_TIME field 241 indicates the start time of the event in question. It should be noted that the value in field 241 corresponds to a UNIX "epoch" time, i.e., the number of seconds elapsed from Jan. 1, 1970. Similarly, EVENT_END_TIME field 245 indicates the end time of the event in question. Thus, with such event start and end times, the duration of the event in question can be determined. OPERATOR_LOGIN_ID field 243 identifies the operator handling the event. Field 247 is described previously. OUT_SPAN field 249 identifies the T1 span transporting the outgoing communication of the information assistance call.

Figure 3:
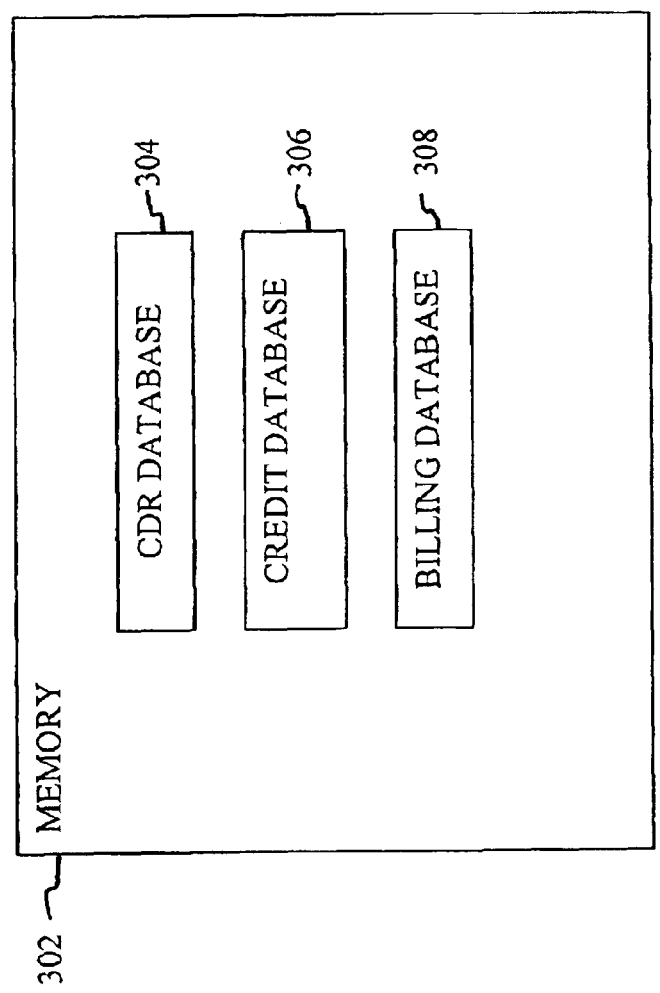
FIG. 3 is a block diagram depicting memories in host computer shown in FIG. 1.

In this instance, each event record is further formatted by the system component in packet form by adding a header to the record. Such a header includes a destination address of one or more computers or servers to which the event record pertains will be sent or routed for further processing, and a destination type indicating what particular queue or database in the computers or servers to which the event record pertains. For example, the destination address may identify host computer 114 and the destination type may identify a particular database in memory 302 of host computer 114, such as call data record (CDR) database 304 in FIG. 3. Thus, data network 118 routes event record packets to host computer 114 based on the destination address in the packets. Host computer 114 extracts the event records in the received packets and based on the destination type data in the packets, stores the records in CDR database 304.

When a customer calls the information assistance system 100, the customer typically is billed for information assistance services provided in the call and connection charges, through his/her own carrier. These information assistance services include directory assistance and enhanced services, such as the aforementioned STARBACK® service. The connection charges include any applicable long distance and/or local toll charges (imposed by the carrier), any airtime charges (imposed by the carrier), and any other charges, such as paging and messaging charges, which are imposed or incurred when performing the information assistance service. Information assistance service charges imposed by the information service provider may be billed on a per call basis, or may be billed, depending upon a variety of factors, such as the duration of the information assistance/operator time, or the event type or class of information searched.

From time to time, a customer may request directory information that is not found, in which case the information assistance call cannot be connected to the requested number. At other times, a call cannot be connected because, for example, while the requested number exists, it is out of service or there is no answer. In these situations, no information assistance services are provided.

At other times, a customer may initially be provided with correct information. The customer may then make an additional information request and receive wrong, incorrect, or otherwise unsatisfactory service. As a consequence, the customer may request credit in the same call for the subsequent information request. In this situation, service was provided for not only the first information request but also for the second information request in the same call, however, a wrong number or the wrong information was provided (collectively, referred to as "wrong service") in the subsequent information request.

In addition, wrong service may occur initially in a call, but the customer may remain on the call and request additional information. The subsequent service is then correctly provided. In this situation, wrong service was initially provided for the first information request, and then correct service was provided for the second information request, in the same call.

Alternatively, credit may be requested for an earlier call or portion of a call, in another call from an information service provider subsequent to the earlier call. In this situation, wrong service is provided in an earlier call or in a portion of an earlier call, and the customer seeks credit for the subsequent call in which credit for an earlier call (or portion thereof) is requested, as well as for the earlier call or portion of the call.

Thus, where the information assistance service provides either no service or wrong service for all or a portion of a call (conveniently termed a "bad call"), a customer may in the same call or in another, subsequent call, request a credit for all or a portion of the call. A customer may request credit for the entire call where the customer made one request and no service or wrong service was provided for the request. A customer may request credit for the entire call where several information requests were made in the same call but no service or wrong service was provided for all the requests. A customer may also request credit for a portion of a call, where more than one information request was made in the call, but where no service or wrong service was provided for at least one of the requests.

To issue customer credits for all or any portion of the information assistance call, according to an embodiment of the invention described herein, one or more event records pertaining to the portion of the call to be credited are not included in billing database 308. As is well-known, the contents of billing database 308, which includes event records for calls to be billed to customers, are transmitted to a billing platform (not shown) from time to time to compile customer charges.

Records of events which occurred in a call may be correlated by the same sequence identification number, such as CDR_CALL_SEQ_NMBR field 213 in FIG. 2, identifying the call. Each information assistance call is associated with customer information, such as ANI or SUBSCRIBER_MDN field 207 information as shown in FIG. 2, and/or a customer identification number assigned by the carrier. CDR database 304 contains event records which reflect all events, including those that incur charges, or from which charges may be derived, such as call duration, toll connection, information assistance service, and the type and/or class of information service provided, to the extent that charges vary depending upon the type of information service provided.

The billing platform invoices customers based on records provided from billing database 308. It is understood that a billing platform may be within system 100 (not shown), or within a third party billing system or a carrier system.

Where a customer requests a credit for an information assistance call or portion thereof, the event record pertaining to the event for which credit was requested, in accordance with the invention, is not contained in billing database 308 and thus is not sent to the billing platform. When a customer seeks a credit, the customer contacts the operator, either in the same call or in a call subsequent to the call in which credit is requested. The operator, accordingly, after eliciting certain information from the customer concerning the call for which credit is requested and the current call, depending upon the situation, depresses a key on terminal 116 which triggers host computer 114, depending upon the situation, to issue a transaction record which contains the CDR call sequence number, i.e., CDR_CALL_SEQ_NMBR 213, for the current call and time of the transaction.

After the issuance of the transaction record, host computer 114, in this embodiment, or a processor of a server in another embodiment, runs a routine 400 to identify the event record(s) from CDR database 304 for the call or portion of the call for which credit is requested. Only those identified event record(s) in database 304 are copied to billing database 308.

As a result, event records for which credit has been requested are, in effect, "scrubbed" or excluded from database 308 and thus are not sent to the billing platform.

Credit may not be provided if the event record pertaining to the call for which credit has been requested is no longer in the CDR database 304 as database 304 may have limited storage. Thus, operator terminal 116 allows operator to determine whether the event record pertaining to the call for which credit has been requested is still in database 304. In addition, terminal 116 also allows operation to trigger host computer 114 to run a routine which determines the duration of the call connection, and whether the call, depending on its duration, is a candidate for credit. For example, a call having a duration longer than a predetermined time limit may be designated by information assistance system 100 to be ineligible for credit. It is understood that information assistance system 100 may impose other restrictions in credit issuance, which may be implemented in accordance with the invention. Checking on whether credit issuance restrictions apply, e.g., whether the event record is in database 304, or whether call duration exceeds a predetermined time limit, may be incorporated in routine 400.

Event records generated by components of system 100 are used for bill processing in a billing platform. Billing database 308 may contain call set-up information not previously associated with an event record and other information generated by host computer 114 or server (not shown) on the system 100 that may be useful for billing, such as the duration of the connection, and rate structures applicable to a customer.

A customer may call system 100 in the same call or in another call to request credit for a call or portion of a call. The operator, upon receiving the request, causes a transaction record to be generated on terminal 116. However, this transaction record is not included in billing database 308 so that the customer would not be charged for the current credit request. The transaction record may include a time stamp indicating when the transaction record is generated, and may contain information elicited by the operator from the customer such as whether the credit being requested is for the current or an earlier information assistance call, if an earlier call the approximate time thereof, etc. It may also contain information input by the operator and/or components of system 100 such as the ANI concerning the customer call, the event class/type information of the service for which credit is being requested, etc. Such event class/type information may be input by an operator by selecting from a list on terminal 116 a service description matching the service description by the customer.

The aforementioned transaction record is transmitted to computer 114 for credit processing in accordance with the invention. Upon receiving the transaction record at step 402 in FIG. 4, computer 114 determines based on information in the received transaction record whether the credit is requested for the current information assistance call, or for an earlier call, as indicated at step 404.

Where credit is requested for an earlier call, computer 114 obtains from the transaction record additional information such as the time of the transaction record ("time stamp"), step 406, the approximate time of the information assistance call for which credit is requested, step 408, the ANI, step 410, and the event class and/or type information for the call or portion of the call for which credit is requested, step 412. It should be noted that the ANI from the transaction record is associated with the communication device from which the current customer call originates. For fear that the earlier call originated from a different communication device used by the same customer, which is unlikely, the operator needs to verify with the customer whether the ANI in the transaction record applies to the earlier call. If it does not apply, the operator should have replaced such an ANI in the transaction record with the telephone number of the communication device from which the earlier call originated.

Based on the information obtained in steps 406, 408, 410 and 412, computer 114 searches CDR database 304 to identify the event record for the call or portion of the call to be credited, step 414. For example, in identifying such an event record, computer 114 searches for those event records in database 304 having EVENT_START_TIME equal or close to the approximate time obtained from step 408 (e.g., within a predetermined time before and after the approximate time) but before the transaction record time obtained from step 406. Computer 114 further screens the uncovered records for the event record having SUBSCRIBER_MDN and EVENT_CLASS/_TYPE IDs matching the information obtained from steps 410 and 412, respectively.

At step 416, computer 114 copies the EVENT_MONITOR ID of the identified event record to credit database 306. Computer 114 at step 418 marks those event records in CDR database 304 having the same EVENT_MONITOR_IDs as those in credit database 306. Computer 114 at step 420 copies those unmarked event records in CDR database 304 to billing database 308. Computer 114 at step 422 transfers the billing records from billing database 308 to the billing platform for completion of bill processing in a well known manner.

Where credit is requested for the current call, computer 114 determines from the transaction record whether multiple services were provided in the call, step 424. If multiple services were not provided in the same call, then the event record to be credited is identified by the CDR_CALL_SEQ_NMBR of the current call, step 426. The identified event record is then processed further according to steps 416 through 422 described above Where multiple services were provided in the current call in which credit is requested, the event record of each service for which the credit is requested may be identified and processed in accordance with steps 410 through 422 describe above.

The following are examples illustrating four situations in which the system in accordance with the invention issues customers credit. There may be other examples within the knowledge of one of ordinary skill in the art that are intended to be encompassed by the invention.

EXAMPLE 1

Credit Request Made in the Current Call; No Service Provided

In this example, a customer makes a call via carrier network, which is routed through a carrier switch, termed an "originating switch". The call is routed into the information assistance system via servicing switch 106. Servicing switch 106 tracks the call through every event that occurs within it until it terminates the call. In doing so, event records similar to that shown in FIG. 2, are generated. Each event record associated with a single call is "tagged" with a single call sequence identification number, such as CDR_CALL_SEQ_NMBR field 213 of FIG. 2, which is unique to that customer's call.

In this example, if the requested number or other information is not found or service cannot otherwise be provided, i.e., call cannot be connected and service cannot be provided, the operator depresses a key on operator terminal 116 (not shown in FIG. 4) that triggers a transaction record to be generated, and causes computer 114 to initiate a credit issuance process, illustrated in FIG. 4. The transaction record captures the sequence identification number for the current call and the current time (termed a "time stamp"). The transaction record can be generated by information assistance service provider platform 104 or the servicing switch 106.

The credit issuance process includes, for example, steps 402, 404, 424, 426, 416, 418, 420 and 422. This process occurs preferably prior to bill processing in say, billing platform (not shown in step 422). The credit issuance process so described, essentially, removes event record(s) having the call sequence identification number of the current call from the billing records transferred to billing platform at step 422.

EXAMPLE 2

Credit Request Made in the Current Call; Wrong Service Provided

In this example, a customer makes a call which is routed and "tagged", as described relative to Example 1 above. In contrast to Example 1, in Example 2, service is provided, but the service is wrong. The customer then prompts the operator using, for example, the STARBACK® prompt, to request credit for the wrong service, to look for the information requested, and to connect the customer to the desired destination number again via terminating switch.

When the customer requests credit, the operator depresses a key that initiates the credit issuance process discussed relative to Example 1. In this example, however, the credit issuance process credits the portion of the call that occurred prior to the time stamp of the current transaction record, but only inclusive of previous information assistance event and termination or call completion event record. Thus, if an information assistance event occurred within the same call, which was earlier than the information event previous to the prompt to the operator, that record would remain, and accordingly be billed.

EXAMPLE 3

Credit Request Made in the Current Call; Wrong Service Provided in An Earlier Call In this example, a customer makes a call which is routed and "tagged", as in Examples 1 and 2. As in Example 2, service is provided, but the service is wrong, and the call is sent out for termination in terminating switch. In contrast to both Examples 1 and 2, in this example, the customer hangs up after the call is terminated, at which point the call event records associated with the call are delivered to the CDR database 304 where they are held for a predetermined length of time.

The customer calls back to request credit for the earlier call in which wrong service was provided. The current call enters originating switch, and the servicing switch 106 tracks the current call until the call is terminated after credit is requested.

The customer then prompts the operator to request credit for the earlier call, as described in Example 2. The operator elicits information from the customer concerning the call, such as whether credit is requested for the current call, and whether the current ANI was the originating telephone number of the call for the earlier call for which credit is requested. The operator then inputs this information into terminal 116 (not shown), and depresses a key on terminal 116 that triggers a transaction record to be generated for the current call by either platform 104 or servicing switch 106. As discussed above, this transaction captures the sequence identification number for the current call and the time stamp.

To credit the earlier call in which wrong service was provided, the operator depresses a credit issuance key on the operator terminal 116, which results in a transaction being issued for the current call and also triggers host computer 114 to create a transaction record for the earlier call in routine 400, illustrated in FIG. 4. Host computer 114 executes the credit issuance process, illustrated in FIG. 4, which searches for the transaction record of the earlier call, based upon the information elicited by the operator from the customer, and the ANI and time stamp from the transaction record for the current call. This results in event records for the subsequent call being removed from billing records, which are eventually sent to a billing platform.

EXAMPLE 4

Credit Request Made in Current Call; Wrong Service Initially Provided, Correct Service is Then Provided, and Subsequently Credit is Requested for the Initial Wrong Service In this example, a routine may be utilized, similar to that described in Example 3 above to search for the event records pertaining to the initial wrong service. As in example 2, the customer prompts for the operator to request credit. As in Example 3, the operator elicits information from the customer concerning the portion of the call for which credit is requested, such as the event class or type for the portion of the call for which credit is requested. The operator inputs this information into operator terminal 116, and depresses a key on the terminal that triggers a transaction record, as discussed in the examples above, which causes host computer 114 to initiate a credit issuance process. The credit issuance process utilizes the routine 400, shown in FIG. 4, to identify the event record for the portion of the call to be credited.

It should be noted that if a credit request is made in a subsequent call for a portion of an earlier call, the event record for the portion of the call to be requested may be provided as in this example.

The foregoing merely illustrates the principles of the invention. It will thus be appreciated that those skilled in the art will be able to devise numerous other arrangements which embody the principles of the invention and are thus within its spirit and scope.

For example, another embodiment in accordance with the invention is that billing database 308 contain all event records, whether or not a customer is to be charged, with the calls for which the customer is not to be charged being marked "no-bill". Thus, in this embodiment, contrary to the implementation discussed above, all event records are sent to the billing platform, but only those event records that have not been marked "no-bill" are processed for billing.

In addition, it is understood that the term "operator" as used herein encompasses entities that are capable of providing assistance in a telecommunications environment, including, without limitation, human operators, voice response/recognition units, web-/WAP-enabled operator services, and other automated and electronic access units providing similar functions.

Further, information assistance system 100 may be implemented with in-band, feature group D (FGD) type signaling, SS7 out-of-band signaling or other signaling for communications between switches (including carrier switches) in FIG. 1. Where SS7 out-of-band signaling is used, system 100 receives the call set-up signals and call progress information (busy, ring-no-answer, number unavailable, answer supervision, etc.) coming from an SS7 signaling link, separate from the voice trunk.

Still further, it is understood that system 100 may provide information assistance services through networks other than telephone networks, such as WANs, and/or the Internet, and includes multimedia facilities, such as text, voice and video facilities. In the case of the Internet, the ANI may be replaced by a URL, using conventional networking and computer equipment.

Finally, information assistance system 100 is disclosed herein, in a form in which various functions are performed by discrete functional blocks. However, any one or more of these functions could equally well be embodied in an arrangement in which the functions of any one or more of those blocks or indeed, all of the functions thereof, are realized, for example, by one or more appropriately programmed processors. In particular, a credit issuance could be achieved by using a discrete server attached to data network 118, instead of credits being processed and issued by host computer 114.

What is claimed is:

1. A method for issuing credits for services requested in information assistance calls, comprising:
    collecting records indicative of the services for billing customers for the services;
    receiving from a customer a request for credit for a service in an information assistance call;
    determining whether the request is received before a termination of the information assistance call;
    obtaining data concerning at least an identifier identifying the information assistance call before a termination of the information assistance call when it is determined that the request is received before the termination of the information assistance call;
    identifying at least one record from the collected records, which concerns the service and contains the identifier; and
    causing the services indicated in the collected records, except the service indicated in the at least one record, to be billed, thereby effecting the credit.

2. The method of claim 1, wherein the data includes data concerning a description of the service.

3. The method of claim 1, wherein a plurality of services, including the service, are provided in the information assistance call.

4. The method of claim 3, wherein the data includes an automatic number identification (ANI).

5. The method of claim 1, wherein the at least one record is identified by a second identifier.

6. The method of claim 5, further comprising storing the second identifier in a credit database.

7. The method of claim 6, further comprising searching the collected records for the at least one record having the second identifier.

8. The method of claim 1, further comprising indicating all of the collected records, except the at least one record, for billing.

9. The method of claim 1, further comprising sending all of the collected records, except the at least one record, to a billing platform for billing.

10. A method for issuing credits for a selected one of a plurality of services provided in an information assistance call, comprising:
    generating a plurality of records indicative of respective ones of the plurality of services provided in the information assistance call;
    receiving from a customer a request for credit for the selected service provided in the information assistance call;
    obtaining data concerning at least an identifier associated with a communications device from which the information assistance call originated, and information for distinguishing the selected service from at least one other service provided in the information assistance call;
    identifying a record from the plurality of records which is indicative of the selected service based on the data and the information; and
    causing the services indicated in the plurality of records, except the selected service indicated in the identified record, to be billed, thereby effecting the credit.

11. The method of claim 10, wherein the communications device comprises a telephonic device, and the identifier comprises a telephone number.

12. The method of claim 11, wherein the telephone number is derived from an ANI.

13. The method of claim 10, wherein the data includes data concerning an approximate time of the information assistance call.

14. The method of claim 10, wherein the data information includes information concerning a description of the selected service.

15. The method of claim 10, wherein the at-least-one identified record is identified by a second identifier.

16. The method of claim 15, further comprising storing the second identifier in a credit database.

17. The method of claim 10, further comprising indicating all of the plurality of records, except the identified record, for billing.

18. The method of claim 10, further comprising sending all of the plurality of records, except the identified record, to a billing platform for billing.

19. A system for issuing credits for services rendered in information assistance calls, comprising:
    a database for providing records indicative of the services for billing customers for the services;
    an interface for receiving from a customer a request for credit for a service in an information assistance call;
    a processor for determining whether the request is received before a termination of the information assistance call, data being obtained concerning at least an identifier identifying the information assistance call before a termination of the information assistance call when it is determined that the request is received before the termination of the information assistance call; and
    a mechanism for identifying at least one record from said database which concerns the service and contains the identifier, and causing the services indicated in the collected records, except the service indicated in the at least one record, to be billed, thereby effecting the credit.

20. The system of claim 19, wherein the interface includes a switching device.

21. The system of claim 19, wherein the interface receives from, and places calls to, one or more telecommunications carrier networks.

22. The system of claim 19, wherein the information assistance call relates to requests for information from an Internet.

23. The system of claim 19, wherein a plurality of services, including the service, are provided in the information assistance call.

24. The system of claim 23, wherein the data includes an ANI.

25. The system of claim 24, wherein the ANI comprises a telephone number.

26. The system of claim 19, wherein the at least one record is identified by a second identifier.

27. The system of claim 26, further comprising a credit database for storing the second identifier.

28. The system of claim 27, wherein the mechanism includes searching the collected records for the at least one record having the second identifier.

29. The system of claim 19, wherein all of the collected records, except the at least one record, are indicated for billing.

30. The system of claim 19, wherein all of the collected records, except the at least one record, are sent to a billing platform for billing.

31. A system for issuing a credit for a selected one of a plurality of services provided in an information assistance call, comprising:

a database for providing a plurality of records indicative of respective ones of the plurality of services provided in the information assistance call;

an interface for receiving from a customer a request for a credit for the selected service provided in the information assistance call;

a processor for obtaining data concerning at least an identifier associated with a communications device from which the information assistance call originated, and information for distinguishing the selected service from at least one other service provided in the information assistance call; and a mechanism for identifying a record from the plurality of records which is indicative of the selected service based on the data and the information, and causing the services indicated in the plurality of records, except the selected service indicated in the identified record, to be billed, thereby effecting the credit.

32. The system of claim 31, wherein the communications device comprises a telephonic device, and the identifier comprises a telephone number.

33. The system of claim 32, wherein the telephone number is derived from an ANI.

34. The system of claim 31, wherein the data includes data concerning an approximate time of the information assistance call.

35. The system of claim 31, wherein the information includes information concerning a description of the selected service.

36. The system of claim 31, wherein the identified record is identified by a second identifier.

37. The system of claim 36, further comprising a credit database for storing the second identifier.

38. The system of claim 31, wherein all of the plurality of records, except the identified record, are indicated for billing.

39. The system of claim 31, wherein all of the plurality of records, except the identified record, are sent to a billing platform for billing.

* * * * *